3,499,099
CABLE JOINT HAVING CONDUCTIVE RINGS FOR ESTABLISHING LINEAR LONGITUDINAL VOLTAGE STRESSES
Carlton T. Nicholson, Orchard Park, N.Y., assignor to Niagara Mohawk Power Corporation, Buffalo, N.Y., a corporation of New York
Filed Mar. 21, 1968, Ser. No. 714,951
Int. Cl. H02g 15/08, 3/04
U.S. Cl. 174—73          8 Claims

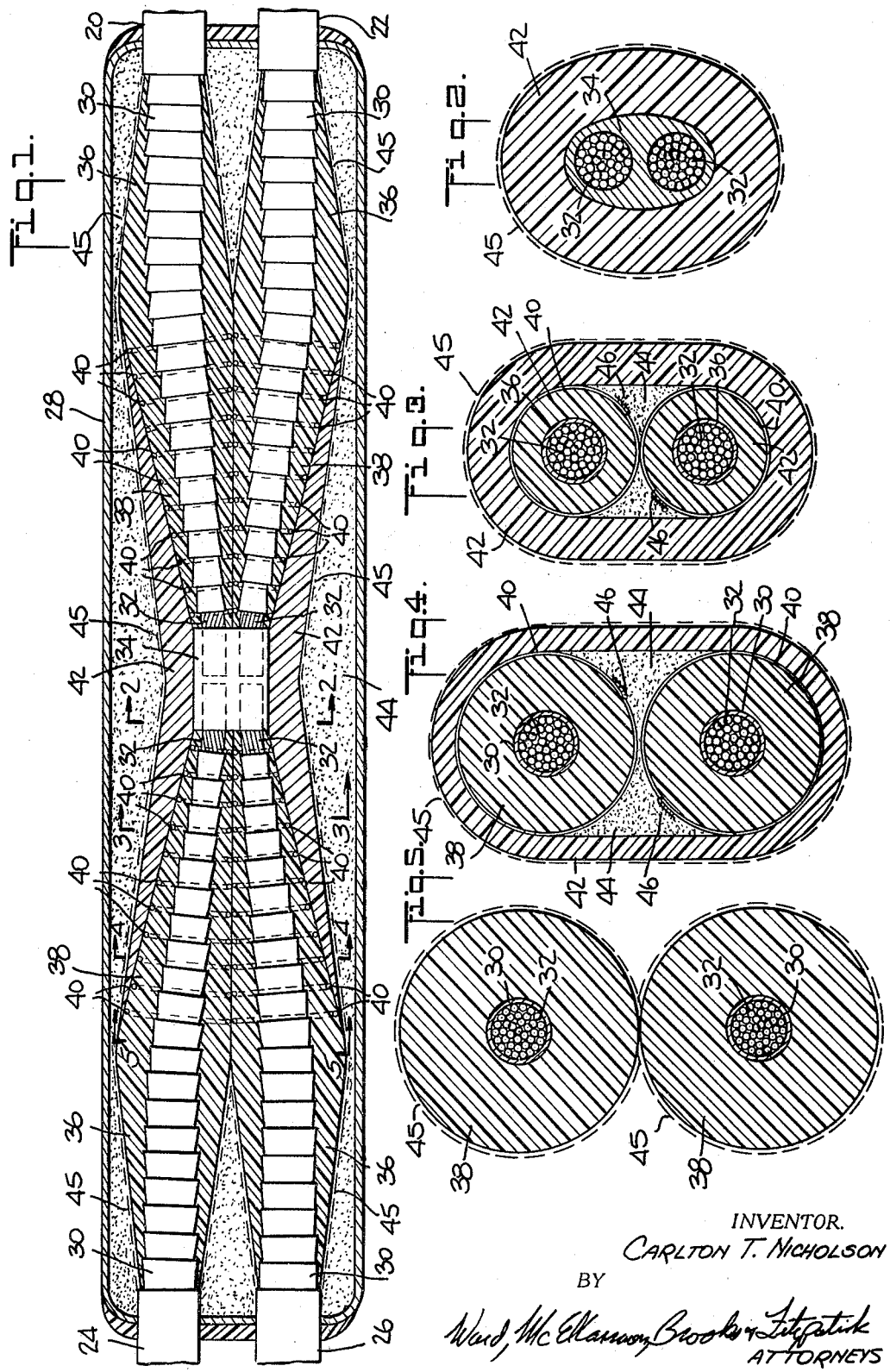

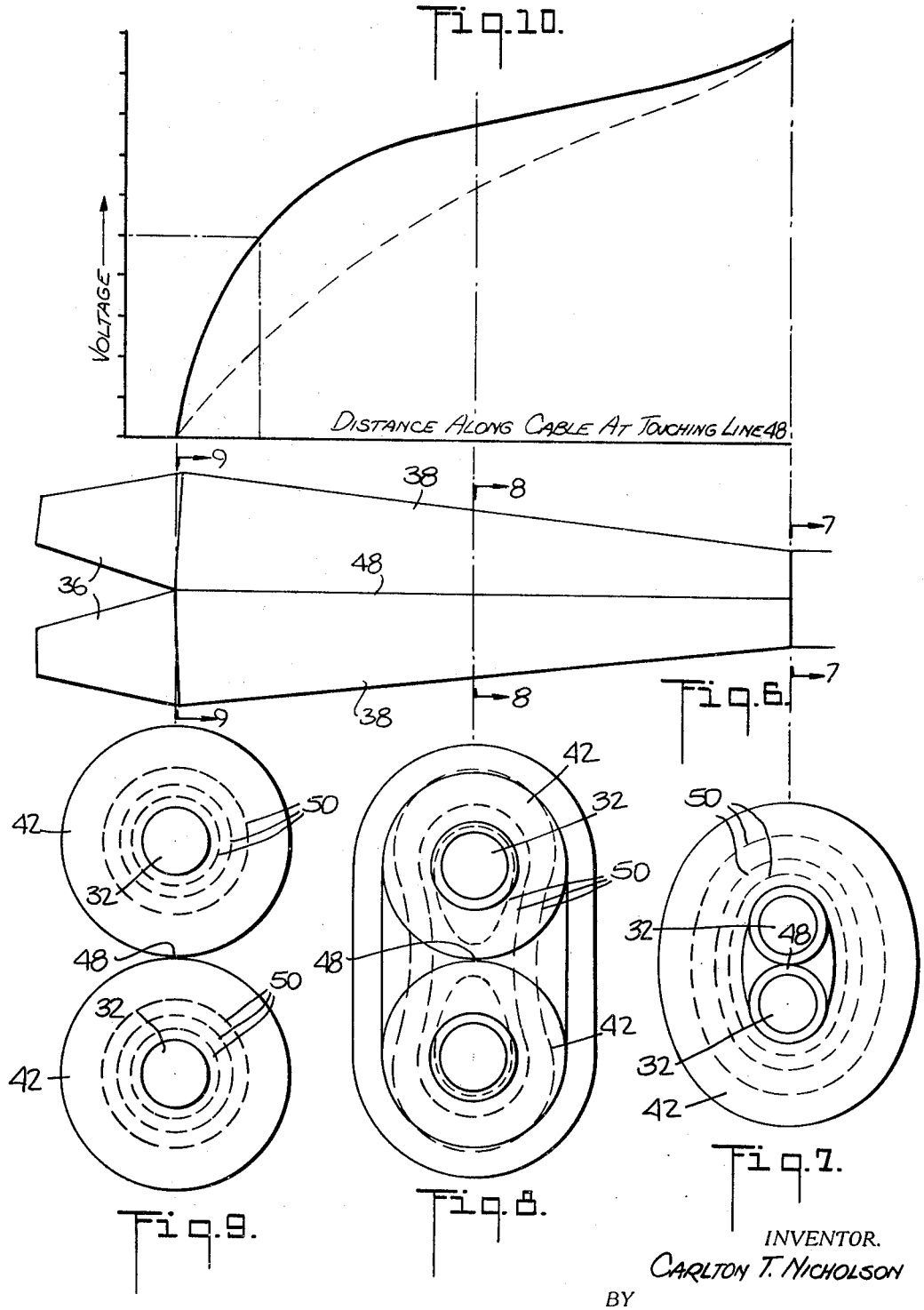

ABSTRACT OF THE DISCLOSURE

An insulated cable joint wherein electrically conductive rings are strategically positioned to linearize longitudinal voltage gradients and thus reduce insulation surface currents to prevent burning.

---

This invention relates to cable joints for connecting together high voltage electrical cables. More particularly, the present invention is directed to the avoidance of insulation breakdowns which result from high voltage gradients along the interior of a cable joint.

Even though two electrical conductors to be joined are at the same voltage and no current flows between them, special problems arise in the design of a suitable joint for the conductors if they are in the vicinity of 15,000–46,000 volts phase to phase. These problems arise from the fact that the outer covering of the cables and of the cable joint must be at ground potential. In order to insulate the cable conductors properly they must be wound with special insulative tape to a certain thickness. However, where the cables come together, the room for the insulative tape diminishes. Any attempt to wind insulative tape around both cable conductors together would leave triangularly cross-sectional gaps in the regions immediately adjacent to where the individual insulative wrappings touch each other. These gaps can of course be filled with insulative compound, but this does not provide the insulating properties of the spirally wound tape.

The positioning of the two cable conductors adjacent one another also produces a diverting effect upon the radial voltage gradients in the insulation region about the conductors. In the case of a single cable in cross section, equivoltage lines exist in the form of concentric circles about the cable conductor. On the other hand, where two cables of the same voltage are in side-by-side relationship, the equivoltage cylinders become attracted to each other and the equivoltage lines in the cable cross section take the form of teardrops which point at each other and actually merge. This has the effect of increasing the voltage in the gap regions adjacent the line along which the individual cable wrappings touch each other. In addition to placing greater stress in the more poorly insulated gap regions, this phenomenon has the effect of redistributing the voltage gradient along the length of the cable insulations in a non-linear manner. As a result, certain regions along the length of the cable insulation will experience greater than average voltage gradients, while others will experience less than average gradients. Longitudinal electrical currents tend to flow across the higher voltage gradient regions with the result that eventually these regions burn and lose their insulative properties. This results in a shifting of the steep voltage gradient along the length of the insulation so that burning will continue until failure occurs.

The present invention overcomes these difficulties of the prior art in a very simple and economical manner. Moreover the present invention makes possible the use of high voltage cable joints in regions where space is at a premium and where the conventional oil-filled underground junctions are not practical.

According to the present invention special electrically conductive elements are strategically positioned in and along the insulation surrounding adjacent cable conductors. These conductive elements may take the form of spaced rings which surround each cable at different locations along its insulation buildup. These rings prevent the occurrence of voltage gradients about the circumference of the cable insulation; and at the same time they distribute the longitudinal voltage gradients more evenly. This serves to minimize the minute longitudinal electrical currents which flow along the surface of the insulative material in response to the voltage gradients. Thus the tendency toward burning of the insulation is reduced and the life of the cable joint is significantly improved.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention.

A specific embodiment of the invention has been chosen for purposes of illustration and description, and is shown in the accompanying drawings forming a part of the specification, wherein:

FIG. 1 is a side elevational view, partly in section of a cable joint forming an embodiment of the present invention;

FIGS. 2–5 are cross-sectional views taken along lines 2—2, 3—3, 4—4, and 5—5 respectively of FIG. 1;

FIG. 6 is a side elevational outline view diagrammatically representing a pair of joined electrical cables;

FIGS. 7, 8 and 9 are diagrammatic cross-section views taken along lines 7—7, 8—8 and 9—9 of FIG. 6; and FIG. 10 is a graph useful in conjunction with FIGS. 6–9 for understanding the operation of the present invention.

The cable joint arrangement shown in FIGS. 1–5 connects together four separate conductors. It will, of course, be understood by those skilled in the art that a three conductor joint can be made in substantially the same manner; and in fact the joint design of the present invention is applicable for individual joints of at least eight conductors arranged with four at each end.

As shown in FIG. 1, four electrical cables 20, 22, 24 and 26 are joined within an outer metal jacket 28. The cables 20 and 22 enter the jacket from one end while the cables 24 and 26 enter from the opposite end. The jacket itself fits tightly about the outer sheath of each of the cables 20, 22, 24 and 26 at their points of entry into the jacket. This ensures a good electrical ground connection between the outer sheath of each cable and the jacket 28; and it serves to prevent the entrance of moisture into the joint itself.

Immediately inside the outer jacket 28, the outer sheath of each cable terminates, thus exposing a wrapped paper insulation 30. This paper continues along over a central cable conductor 32 toward a common copper connector 34 located in the middle of the joint. Each of the cable conductors 32 are clamped to the common connector 34.

The wrapped paper insulation 30 on each cable is tapered stepwise between the connector 34 and a stress cone 36 within the outer jacket 28. This tapering is achieved by removal of greater numbers of turns of the paper insulation, proceeding along the cable toward the connector 34 from each stress cone 36.

The cables 20, 22, 24 and 26 are each individually wrapped with a first insulative covering of oil packed VC (i.e. varnished cambric) tape superimposed over the wrapped paper insulation 30. As shown in FIG. 1, this first covering begins at the outer sheath termination of each cable and builds up in a taper to a maximum diameter about one third of the way to the connector 34 thus forming the stress cone 36 of each cable. Beyond each stress cone the first covering forms an inward taper 38 which extends to the connector 34. The cables are arranged so that the inward taper 38 of each adjacent cable touches along its length between the connector 34 and the stress cones 36.

A plurality of longitudinally spaced conductive rings 40 encircle the taper 38 of each cable. These conductive rings serve to distribute the electrical stress pattern within the joint in a manner such as to reduce high gradients. This, as will be explained more fully hereinafter, serves to reduce the tendency toward burning in localized regions of the joint.

A second outer covering 42 of oil packed tape wrapping surrounds the connector 34 and extends therefrom to merge with the stress cones 36. It will be noted that the second covering 42 on one side of the connector 34 winds around both the cables 20 and 22; and on the other side of the connector 34 it winds around both the cables 24 and 26. Because of this arrangement, there remain generally triangularly cross sectioned spaces 44 (FIGS. 2–4) on each side of and immediately adjacent the line of contact for the inward taper 38 of each adjacent cable. The spaces 44 are filled with an electrically insulative filling compound. The space between the second outer covering 42 and the outer jacket 28 may also be filled with a similar filling compound. An electrically conductive shielding 45 of braided or woven filaments is placed over the stress cones 36 and the second outer covering 42.

As shown, the shielding is connected to the terminated outer sheath of each of the cables 20, 22, 24 and 26. Referring more specifically to FIGS. 3 and 4, it will be noted that the individual conductive rings 40 are made from copper wire wrapped about the inward taper 38 of the first insulative tape covering. The ends of the wire rings are twisted together as at 46 and are bent to lie flat against the surface of the tape. The longitudinal spacing of the rings as shown in FIG. 1, corresponds to the steps of the wrapped paper insulation 30. Actually, the conductive rings 40 may be placed inside the first insulative tape covering and directly on the wrapped paper insulation at each step.

FIGS. 6–10 illustrate the manner in which the present invention operates to redistribute voltage stresses along the joint to reduce voltage gradients. In FIG. 6 a pair of adjacent cables are shown in the position they occupy within the joint. As can be seen the individual first insulative tape covering cable forms the stress cones 36 and the inward tapers 38. The cables are oriented so that they diverge slightly out away from the connector 34. The inward taper 38 of each tape covering touches along a longitudinal line 48.

In the enlarged cross sectional views of FIGS. 7, 8 and 9 there are shown a plurality of dotted lines 50. Each line represents a different voltage and the various regions through which each line extends are regions of equal voltage. As can be seen in FIG. 7, the lines 50 are oval and are centered around the generally oval shape connector 34. Thus the voltage in the insulation decreases generally uniformly going radially outward from the connector. In FIG. 9, which shows the cross section at the beginning of the stress cones 36, the individual cable conductors 32 are a maximum distance apart and a sepaarte voltage gradient exists for each conductor, with separate sets of equal voltage lines 50 extending circularly about each of the conductors 32. Between the stress cones 36 and the connector 34 the equal voltage lines 50 take on a different configuration as illustrated in FIG. 8. Since there exists no region of ground potential directly between the two conductors 32, the tendency for the voltage to decrease toward ground in this region is reduced and the equal voltage lines 50 are drawn toward each other and even merge in the region directly between the conductors.

As a result of this distortion of the equal potential lines by the cable conductors a voltage gradient exists about the curcumference of each cable's insulation and circulating currents tend to flow about the conductors. In addition, the voltage gradient along the inward taper 38 of the first insulation of each cable is quite large in the vicinity of the stress cones 36 and relatively small in the vicinity of the connector 34. This is illustrated graphically in FIG. 10 by a solid line representation.

Because of the high longitudinal voltage gradients present in the vicinity of the stress cones 36, a finite electrical current may flow along the insulation surface in this region. After a certain length of time this longitudinally flowing current may burn out the insulation in the region and thus drastically reduce its insulative properties. As a result the steep voltage gradient grows steeper and shifts down toward the connector, thus inducing further burning of the insulation.

The conductive rings 40 of the present invention serve to prevent the occurrence of voltage gradients about the cable insulation surface at each cross section. This is achieved by eliminating substantially all electrical resistance about the insulation surface. As a result the entire circumference will be at equal potential. Any current flow ned to achieve this will take place in the rings themselves and not in the insulation. This redistribution of voltage about the surface of the cable insulation serves to cancel the effect of the presence of the associated cable conductor and to change the voltage pattern in the cable insulation so that it more closely approximates that which would exist in the absence of the associated cable.

The voltage redistribution brought about by the rings 40 further serves to render the longitudinal voltage gradient more linear between the stress cones 36 and the connector 34. As shown in FIG. 10, the solid line curve A, which represents the voltage gradient along a touching line 48 between two adjacent insulation tapers 38 without the rings 40, is steeper in the vicinity of the stress cones 36. This indicates that greater stray currents will flow through the insulation in this region. However, because of the linearizing effects of the rings 40, this voltage gradient can be lessened as illustrated by the dashed line curve B in FIG. 6.

The longitudinal displacement, the diameter, the surface area and the number of the rings 40 can be arranged at will for maximum effectiveness. In general, however, the rings should be spaced or proportioned with their greatest effectiveness (e.g. least spacing) occurring where the longitudinal voltage gradient is least. As can be seen in FIG. 10, the linearization of the voltage gradient serves to distribute each voltage increment more equally over each incremental length of cable insulation. Thus the sharp voltage gradients are eliminated as are the electrical current produced by them. Accordingly the tendency toward burning of the cable insulation is minimized and the life of the cable joint is correspondingly extended.

It will be appreciated that the above-described joint arrangements are applicable to both AC and DC energization. In the case of DC energization, the rings serve to control the effects of the electrical resistance characteristics of the insulation. In the case of AC energization, the rings serve to control the effects of the electrical capacitive characteristics of the insulation.

Having thus described the invention with particular reference to the preferred form thereof, it will be obvious to those skilled in the art to which the invention pertains, after understanding the invention, that various changes and modifications may be made therein, without departing from the spirit and scope of the invention.

What is claimed as new nd desired to be secured by Letters Patent is:

1. A joint for high voltage electrical conductors comprising electrically conductive connector means clamping together the ends of at least two elongated electrical conductors in a manner such that they extend together from said connector means in the same general direction whereby said conductors tend to create in the area therebetween and near said connector a nonlinear longitudinal voltage gradient, separate insulating means covering each conductor and extending out from said connector means, and a plurality of longitudinally spaced electrically conductive rings encirling each of said electrical conductors and disposed along the length of said area, each of said rings encircling only one of said conductors and being spaced by said insulating means from its associated conductor and from the other rings which encircle said associated conductor to redistribute said longitudinal voltage gradient whereby large longitudinal circulating currents are minimized and life of the cable joint is improved.

2. A cable joint as in claim 1 wherein said joint includes an outer electrically conductive covering enclosing said conductors, said insulating means and said rings.

3. A cable joint as in claim 1 wherein said electrically conductive rings are spaced along the length of said area in a manner that their least spacing occurs where the longitudinal voltage gradient along said area is least.

4. A cable joint as in claim 1 wherein said insulation means is conically shaped on each conductor and is tapered inwardly toward said connector means.

5. A cable joint as in claim 4 wherein said electrically conductive rings are formed about said conically shaped insulating means.

6. A cable joint as in claim 4 wherein said conically shaped insulating means comprise electrically insulative tape wound spirally about said electrical conductors.

7. A high voltage cable joint comprising a generally elongated tubular metallic outer casing having openings formed in the ends thereof for the reception of cables to be joined, an electrical connector located within said outer casing and joining together the ends of the electrical conductors of cables entering into said casing, at least two of said electrical conductors extending from said connector in slightly diverging fashion toward one end of said housing whereby said conductors tend to create in the area therebetween and near said connector a nonlinear longitudinal voltage gradient, abutting conically shaped insulating means on each of said electrical conductors along the length of said area and increasing a thickness toward said one end of said casing, and a plurality of longitudinally spaced electrically conductive rings about each of said conically shaped insulating means, each of said rings being about only one of said conically shaped insulating means and being spaced by same from said conductors and from the other rings to redistribute said longitudinal voltage gradient whereby large longitudinal circulating currents are minimized and life of the cable joint is improved.

8. A cable joint as in claim 7 wherein the ends of said two electrical conductors are held closely adjacent each other by said connector.

References Cited

UNITED STATES PATENTS

| | | | |
|---|---|---|---|
| 1,895,396 | 1/1933 | Pfannkuch | 174—73 |
| 2,290,706 | 7/1942 | Phillips | 174—88 X |

LARAMIE E. ASKIN, Primary Examiner

U.S. Cl. X.R.

174—88